(12) United States Patent
Davidson et al.

(10) Patent No.: US 10,417,469 B2
(45) Date of Patent: Sep. 17, 2019

(54) NAVIGATION USING SELF-DESCRIBING FIDUCIALS

(71) Applicants: Morgan E. Davidson, River Heights, UT (US); Randall S. Christensen, Vail, AZ (US); Richard C. Robinson, Lindon, UT (US)

(72) Inventors: Morgan E. Davidson, River Heights, UT (US); Randall S. Christensen, Vail, AZ (US); Richard C. Robinson, Lindon, UT (US)

( * ) Notice: Subject to any disclaimer, the term of this patent is extended or adjusted under 35 U.S.C. 154(b) by 138 days.

(21) Appl. No.: 15/588,661

(22) Filed: May 7, 2017

(65) Prior Publication Data

US 2017/0323129 A1 Nov. 9, 2017

Related U.S. Application Data

(60) Provisional application No. 62/333,219, filed on May 7, 2016.

(51) Int. Cl.
| | | |
|---|---|---|
| *G06K 7/10* | (2006.01) |
| *G01C 21/28* | (2006.01) |
| *G11B 7/08* | (2006.01) |
| *G06K 9/20* | (2006.01) |
| *G06K 7/14* | (2006.01) |
| *G01C 21/16* | (2006.01) |

(52) U.S. Cl.
CPC ......... *G06K 7/10871* (2013.01); *G01C 21/28* (2013.01); *G06K 9/20* (2013.01); *G11B 7/08* (2013.01); *G01C 21/165* (2013.01); *G06K 7/1413* (2013.01); *G06K 7/1417* (2013.01); *G06K 7/1421* (2013.01); *G06K 2007/10485* (2013.01)

(58) Field of Classification Search
CPC ...... G06K 7/10871; G06K 9/20; G01C 21/28; G11B 7/08
USPC .......................................................... 701/533
See application file for complete search history.

(56) References Cited

U.S. PATENT DOCUMENTS

| | | | |
|---|---|---|---|
| 5,794,348 A | 8/1998 | Scott | |
| 6,654,482 B1 | 11/2003 | Parent et al. | |
| 7,231,063 B2 | 6/2007 | Naimark et al. | |
| 7,739,034 B2 | 6/2010 | Farwell | |
| 9,056,676 B1 * | 6/2015 | Wang | B64F 1/00 |
| 9,217,643 B1 | 12/2015 | Belenkii et al. | |
| 9,359,074 B2 | 6/2016 | Ganesh et al. | |

(Continued)

FOREIGN PATENT DOCUMENTS

EP 1983398 12/2012

OTHER PUBLICATIONS

Mark Fiala, ARTag, a fiducial marker system using digital techniques, 2005.

(Continued)

*Primary Examiner* — Yazan A Soofi (57) ABSTRACT

In one embodiment, a self-describing fiducial includes a communication element that optically communicates navigation-aiding information. The navigation-aiding information may include a position of the self-describing fiducial with respect to one or more coordinate systems and the communication element communicates the navigation-aiding information to one or more navigating objects in the vicinity of the self-describing fiducial.

20 Claims, 6 Drawing Sheets

(56) References Cited

U.S. PATENT DOCUMENTS

| | | | |
|---|---|---|---|
| 9,696,159 | B2 | 7/2017 | Chen et al. |
| 9,964,951 | B1* | 5/2018 | Dunn .................... G05D 1/0088 |
| 10,032,384 | B1* | 7/2018 | Boyd .................... G08G 5/0069 |
| 2009/0177398 | A1 | 7/2009 | Belenkii et al. |
| 2012/0188350 | A1 | 6/2012 | Hammond et al. |
| 2014/0146167 | A1* | 5/2014 | Friend .................... G01S 17/023 348/118 |
| 2015/0066240 | A1 | 3/2015 | Das Adhikary |
| 2015/0127251 | A1 | 5/2015 | Chen et al. |
| 2016/0068264 | A1 | 3/2016 | Ganesh et al. |
| 2016/0122038 | A1* | 5/2016 | Fleischman ............... G06T 7/73 701/2 |
| 2016/0124431 | A1* | 5/2016 | Kelso .................... B64C 39/024 701/28 |
| 2016/0274586 | A1* | 9/2016 | Stubbs ............... G06K 7/10366 |
| 2016/0292865 | A1 | 10/2016 | Floor et al. |
| 2017/0011333 | A1* | 1/2017 | Greiner ................ G06Q 10/083 |
| 2017/0072563 | A1* | 3/2017 | Anderson-Sprecher ..................... G05D 1/0297 |
| 2017/0138732 | A1* | 5/2017 | Pettersson ............. B64C 39/024 |
| 2017/0329335 | A1* | 11/2017 | DelMarco ................. G06T 7/32 |
| 2018/0039286 | A1* | 2/2018 | Tirpak ................. G05D 1/0676 |
| 2018/0107211 | A1* | 4/2018 | Schubert ............. G05D 1/0044 |
| 2018/0204331 | A1* | 7/2018 | Omari ................ H04N 5/23222 |

OTHER PUBLICATIONS

Justin R. Rufa, Ella M. Atkins, "Observed Time Difference of Arrival/GPS Fusion for Urban UAS Navigation using Particle Filtering Techniques", AIAA Guidance, Navigation, and Control Conference, Aug. 2013.

Allen D. Wu et al., "Autonomous Flight in GPS-Denied Environments Using Monocular Vision and Inertial Sensors", Journal of Aerospace Information Systems, vol. 10, No. 4, Apr. 2013.

Kevin Ling, "Precision Landing of a Quadrotor UAV on a Moving Target Using Low-cost Sensors", Thesis, University of Waterloo, Waterloo, Ontario, Canada, 2014.

Stephen M. Chaves et al., "NEEC Research: Toward GPS-denied Landing of Unmanned Aerial Vehicles on Ships at Sea", 2015.

Jun-Tao Li et al. "Design Optimization of Amazon Robotics", Automation, Control and Intelligent Systems, vol. 4, No. 2, 2016, pp. 48-52.

Ramesh Raskar et al. "RFIG Lamps: Interacting with a Self-Describing World via Photosensing Wireless Tags and Projectors", Siggraph, 2004.

Vincent Calmettes et al. "Vision Aided INS/GNSS Integration for Improving the Robustness of a Navigation System for Mini Unmanned Aerial Vehicles", Proceedings of the 2013 International Technical Meeting of the Institute of Naviation, pp. 780-791, Jan. 2013.

Stefan Hrabar et al. "Vision-Based Navigation through Urban Canyons", Abstract only, Journal of Field Robotics, 26(5), pp. 431-452, May 2009.

Chris Smith "Life Hack: Hidden trick helps you navigate New York's Central Park without Google Maps", http://BGR.com/Category/Lifestyle, Jul. 2015.

Young Ahn et al. "Autonomous Navigation and Localization of a Quad-Rotor in an Indoor Environment", AIAA Journal of Aerospace Information Systems, Mar. 2015.

* cited by examiner

NAVIGATION USING SELF-DESCRIBING FIDUCIALS

RELATED APPLICATIONS

The present application claims priority under 35 U.S.C. § 119(e) to U.S. Provisional Application No. 62/333,219, filed May 7, 2016, titled "Navigation Using Self-Describing Fiducials." This application is hereby incorporated by reference in its entirety.

BRIEF DESCRIPTION OF THE DRAWINGS

The accompanying drawings illustrate various embodiments of the principles described herein and are a part of the specification. The illustrated embodiments are merely examples and do not limit the scope of the claims.

DESCRIPTION OF THE INVENTION

Navigation can be understood as the process of estimating an object's position, velocity, and attitude (PVA), along with the associated uncertainty of the same quantities. The term "guidance" can be used to describe the control of the state (or path) of an object using the information obtained from the navigation process. One method for navigation is to blend measurements from two independent, but complementary sources by using mathematical algorithms, such as a Kalman filter.

An inertial measurement unit (IMU) can provide measurements of specific force (i.e. acceleration) and angular rate. Given an initial estimate, PVA can be propagated forward in time using measurements from an IMU. IMU measurements can be relatively accurate for the short term, but the PVA estimates can drift significantly over time due to inaccuracies in the several IMU sensors such as bias and noise.

In contrast, GPS-based position measurements can be relatively inaccurate over the short term, but are very stable in the long term, and can therefore be used to bound the long-term drift associated with the IMU measurements. Furthermore, through appropriate dynamics modeling inside a Kalman filter, several error sources in the IMU measurements can be estimated. These typically include bias, scale factor, and misalignment errors. Thus by observing stable measurements over time, the IMU becomes calibrated and more capable of bridging periods with limited GPS availability. However, for prolonged GPS-denied or GPS-limited periods, the PVA drift can become problematic for successful guidance of the object.

Due to the relatively inaccurate clocks included in consumer-grade GPS receivers, four or more satellites can be required to determine three components of position and a receiver clock bias. The accuracy of GPS measurements is dependent on both the variance of the range measurement to the satellites in view and the geometric arrangement of the satellites. For example, several satellites clustered in the same portion of the sky all have the same range variance, but since the viewing geometry is poor, this will result in an inaccurate position measurement. This is termed geometric dilution of precision (GDOP). Conversely, several satellites that are more uniformly distributed across the sky results in low dilution of precision, and a more accurate position measurement.

There are numerous scenarios where access to GPS measurements is either limited or denied, or where the accuracy of the measurement is significantly degraded. One common scenario is natural or urban canyons, where the navigating object resides deep in the canyon and has a limited view of the sky. In this case, the GDOP is high, the number of visible satellites is low, and radio wave reflections cause errors in determining the range to the satellites. These error sources significantly degrade the accuracy of GPS measurements and can cause Kalman filter divergence and subsequent inability to estimate PVA resulting in inadequate guidance performance. Similar Kalman filter divergence and failure can also occur because of intentional degradation of GPS signals through the use of GPS jammers and spoofers.

Digital cameras can be a sensor for navigation in the presence of limited or denied GPS signals. A common approach for utilization of imagery data provided by these onboard cameras is referred to in the research as Simultaneous Localization and Mapping, or SLAM. In the SLAM approach, the state vector of the Kalman filter is augmented with the location of everyday features observed in the surrounding environment, and the filter attempts to compute the navigating object's PVA (localization) as well as the position of the observed features (mapping). While this approach has been demonstrated to be successful in some cases, the method suffers from significant map drift/error accumulation, is sensitive to incorrect correlation of features over time, and is computationally intensive due to growth of the Kalman filter state vector with each observed feature. This results in costly and power-hungry electronics and a probability of failure that is unacceptable for navigation and guidance of objects such as drones or driverless cars.

The challenge of correlating features over time can be partially overcome by distributing high-contrast artificial features, or fiducials, along the path of the navigating object. However, the problem of simultaneously mapping the fiducials and using them as navigation aids in a reliable fashion persists.

The elements, systems and principles described below describe guidance and navigation that is both low-cost and robust by developing self-describing fiducials which broadcast their position or identity, and a corresponding vision system on the navigating object that finds the fiducial in an image frame, extracts the position or identity information, and utilizes this information combined with the observed line-of-sight to the fiducial to perform navigation and guidance.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment", "an example" or similar language means that a particular feature, structure, or characteristics described in connection with the embodiment or example is included in at least that one embodiment, but not necessarily in other embodiments. The various instances of the phrase "in one embodiment" or similar phrases in various places in the specification are not necessarily all referring to the same embodiment.

Robust navigation can be understood as a process where unbiased PVA estimates are maintained throughout the trajectory of the navigating object, independent of the availability of GPS signals. A self-describing fiducial, as described herein, is any feature that explicitly communicates information to a navigating object so that the navigating object can deduce at least the location of the fiducial. This allows the navigating object to determine its position, velocity, or orientation with respect to the fiducial. For example, a self-describing fiducial may communicate its identity and/or location to the navigating object. In some embodiments, the self-describing fiducial may be a high-contrast feature that communicates information that may include fiducial identification, location (potentially with associated covariance) with respect to a coordinate system as well as ancillary information such as traffic volume levels, flight corridor height and lateral location, speed restrictions, weather information, no fly zones, traffic routing information, traffic patterns and pattern changes, an all-stop signal, etc.

Secure navigation systems can include the ability to encrypt the information transmitted by the self-describing fiducial, such that utilization of the system is limited to authorized objects only. In some embodiments, an autonomous navigation system can have the ability to acquire the fiducial, decrypt and decode the information being transmitted, and utilize the observed line-of-sight to the fiducial along with the decrypted information to autonomously estimate the PVA and the corresponding uncertainty.

Figure 1:
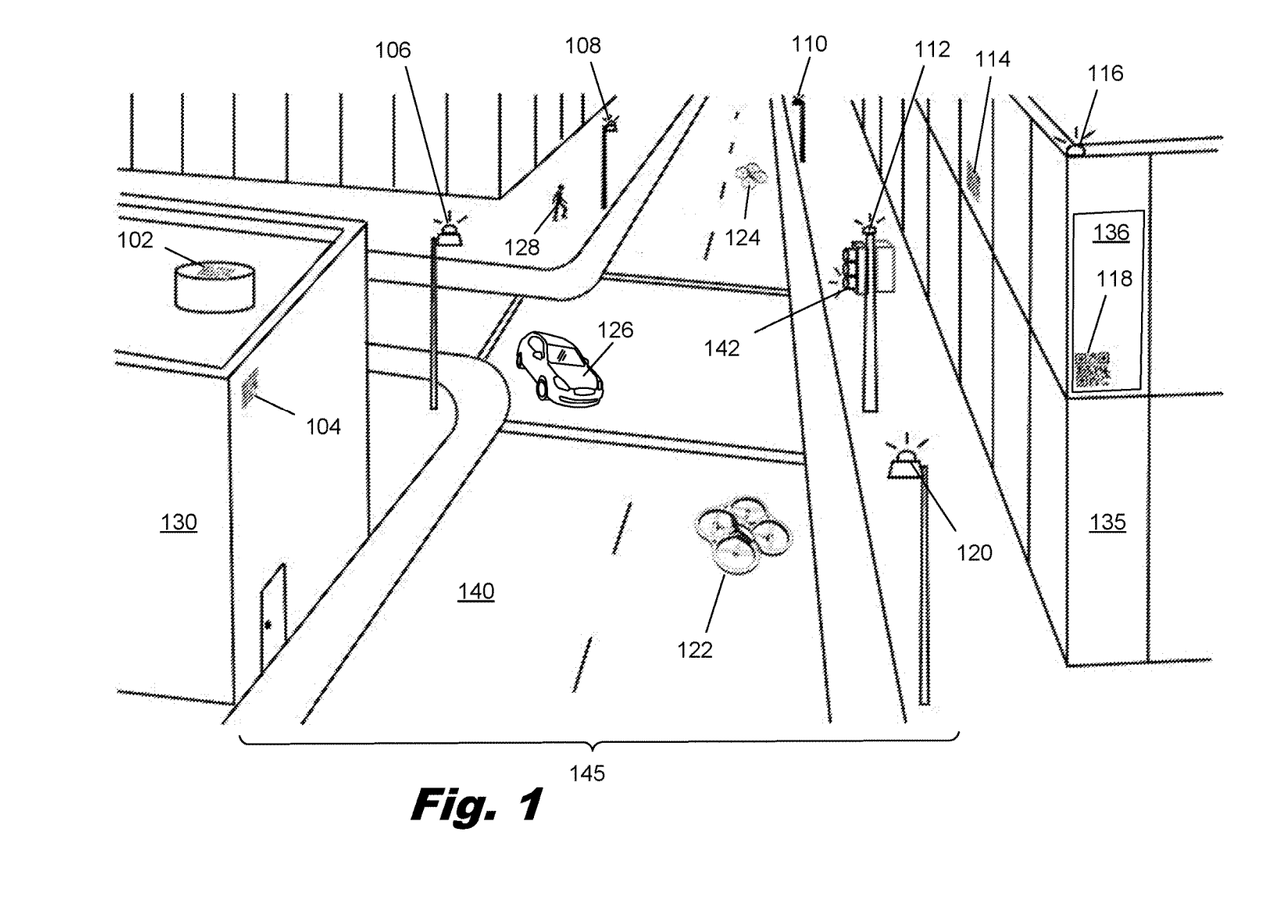
FIG. 1 is a diagram of an illustrative robust and secure autonomous navigation system utilizing self-describing fiducials, according to one embodiment of principles described herein.

FIG. 1 is a diagram of an illustrative example of several embodiments of navigating objects (122, 124, 126, 128) making use of a robust and secure autonomous navigation system utilizing self-describing fiducials (102, 104, 106, 108, 110, 112, 114, 116, 118, 120, 142). In this diagram, several navigating objects are presented including drones (122, 124), a car (126), and a person (128). Several types of self-describing fiducials are also illustrated, including a beacon on top of a lamppost (106, 108, 110, 120), on top of a traffic light post (112), on a billboard (136), as part of the billboard display, and/or embedded in the traffic light (142) itself. Self-describing fiducials in the form of a barcode may also be used on the roadway (140), on the sides of buildings or structures (130, 135) in the urban canyon (145), or on tops of buildings (102) to guide a drone to a landing location or drone service station. The drone service station may include a charging pad, maintenance/repair area, dedicated delivery drop-off location, or other possibilities.

An illustrative embodiment of multiple drones navigating in an urban canyon (145) is discussed, with descriptions of alternative embodiments where applicable. In FIG. 1, two drones (122, 124) are passing through an urban canyon (145) where reliable GPS signals are not available. Guidance algorithms control the trajectory of the drone (122) such that it follows a desired path through the urban canyon (145). Throughout the trajectory, the drone (122) should avoid collisions with surrounding structures (130, 135) and other drones (124), meanwhile contending with disturbance forces such as those from natural winds, turbulence from nearby drones and ground vehicle-traffic-induced winds. Unexpected obstacles can also exist such as new buildings, power lines, construction equipment, etc. To achieve robust, high drone traffic volume and at the same time avoid the many obstacles present, drones can be benefited by unbiased PVA estimates, with minimal associated uncertainty, and the ability to share their location.

The performance of the guidance algorithms, or the ability to control the path of the drone, is directly related to the accuracy of the PVA estimates resulting from the navigation process. If the PVA estimate is biased, this manifests itself as an offset from the desired path of the drone. A PVA estimate with high uncertainty manifests itself as random physical deviations from the desired path. Both of these characteristics require a larger flight volume around the desired path, and result in lower achievable drone density and less efficient use of public airspace. Highly accurate and precise line-of-sight measurements to fiducials with known locations can result in a PVA estimate that is unbiased and exhibits low uncertainty.

Minimizing the bias and uncertainty of the PVA estimates results in a drone that more accurately follows the desired path, enabling higher levels of drone traffic for a given corridor volume. As discussed herein, a robust and secure autonomous navigation system can be created using principles related to self-describing fiducials.

Figure 2A:
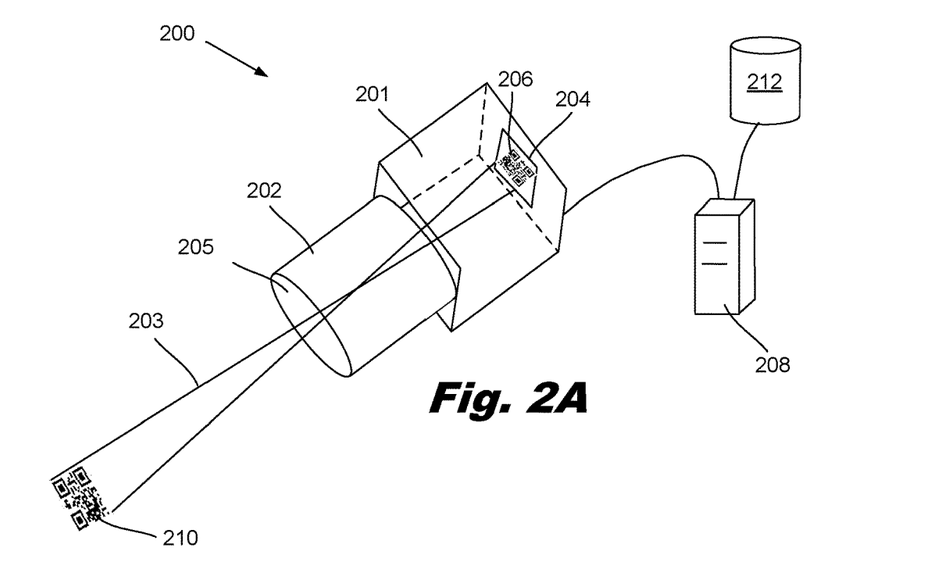
FIGS. 2A and 2B are perspective views illustrating elements within a robust and secure autonomous navigation system utilizing self-describing fiducials, according to embodiments of principles described herein.

FIG. 2A is a diagram of an illustrative imaging system (200) which resides on the drone or other navigating object and includes a camera body (201) which contains a focal plane (204). A lens (202) contains optics which focus light (203) from an exterior scene onto the focal plane (204). In this example, the lens (202) accepts light rays (203) through an aperture (205) and focuses the light rays onto the focal plane (204) to produce an image (206) of the passive, non-changing 2D barcode (210) embodiment of the self-describing fiducial. In this example, the self-identifying information is contained in the encoded pattern of the barcode (210). The image (206) of the barcode on the focal plane (204) is digitized and transmitted to a computing element (208) for further processing. The barcode information along with any corresponding or related data can be temporarily or permanently stored in a data retrieval system (212).

There are a wide range of different self-describing fiducials that could be used. For example, the barcode could include a back light that shines visible wavelengths through the barcode mask, enabling autonomous acquisition of the fiducial in low-light scenarios. Another embodiment incorporates a dynamic or changing barcode where the barcode is modified as desired to transmit updated position or ancillary information. In another embodiment of an active barcode, to increase the magnitude of the emitted light relative to the surroundings, and maintain non-intrusiveness, the barcode emits light in non-visible wavelengths such as IR, NIR, or UV. Another embodiment of a barcode employs a static or changing 3D barcode such that all information in the barcode is visible from any viewing angle. The 3D barcode could be an appropriately painted sphere or internally illuminated sphere with a barcode mask. In another embodiment, the self-describing fiducial is a bokeh code. In another embodiment, the self-describing fiducial consists of a series of symbols, whose information is decoded using character recognition. In another embodiment, the 2D barcode is stretched such that it appears uniform when viewed from a nominal viewpoint.

Figure 2B:
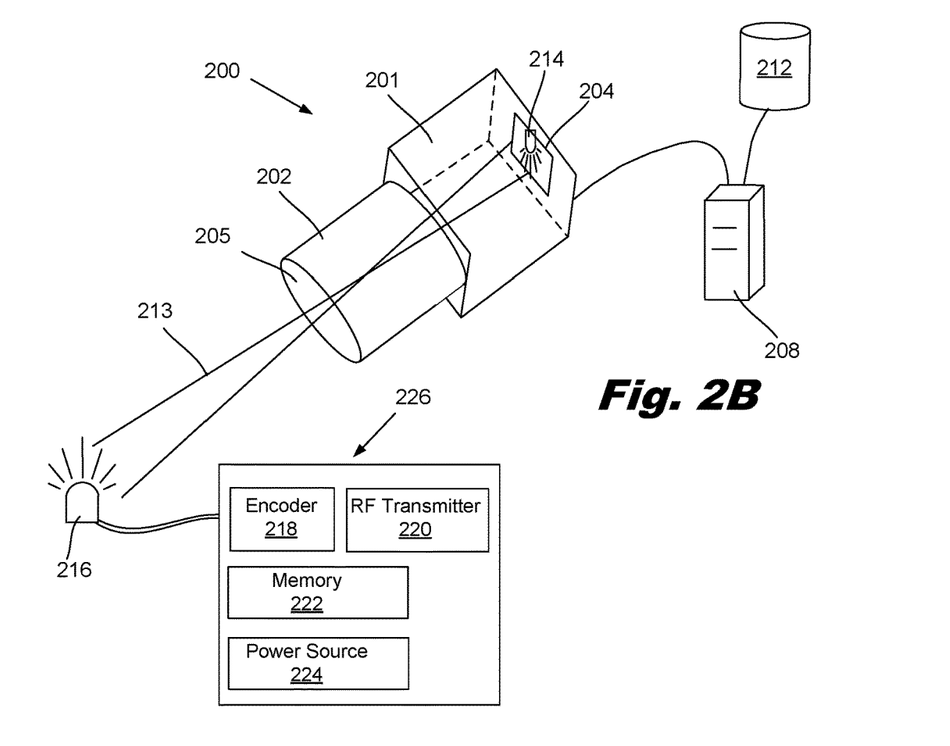

FIG. 2B illustrates an alternative embodiment where the self-describing fiducial (226) may include a power source (224), an encoder (218), memory (222), and an optical transmitter (216). The power source (224) provides power to the encoder (218), and the encoder encodes a location of the self-describing fiducial stored in memory (222) to produce an encoded location and the optical transmitter (216) optically broadcasts the encoded location. The power source (224) may include any of a variety of elements, including batteries and/or solar panels. Additionally, the self-describing fiducial may include a radio frequency (RF) transmitter (220). The RF transmitter may send and/or receive signals from a variety of sources, including other self-describing fiducials, navigating objects, base stations, satellites, etc. The self-describing fiducial may include a variety of other modules and elements such as GPS modules, clocks, cameras, etc.

The optical transmitter (216) includes an LED emitting light (213) in the visible wavelengths, driven by the power source (218), which emits light that is modulated to transmit the self-identifying information. The lens (202) accepts light rays (213) through an aperture (205) and focuses the light rays onto the focal plane (204) to produce the image (214) of the modulated light emitted by the optical transmitter. The intensity of the image (204) over time is digitized and transmitted to a computing element (208) for further processing. In this embodiment, the frame rate of the focal plane (204) can limit the amount of information that can be transmitted by the optical transmitter (216) per unit time. This is referred to as data throughput. The frame rate of the focal plane (204) can be increased by limiting the region of interest in the focal plane to the predicted pixel location of light emitted by the optical transmitter (216). The process of limiting the region of interest can be facilitated using current PVA estimates propagated using IMU measurements. This process also increases robustness by preventing multi-path (reflected) signals, spoofed observations, and minimizing false observations or false positives. Additionally, the gross motion of the image can be measured via optical flow, providing a prediction of where the light emitted by the optical transmitter (216) will be in the following image. In another embodiment, a quad-cell, or a four-pixel focal plane may record the time varying intensity of the observed optical transmitter at a very high rate, while a high resolution focal plane provides the observed line-of-sight. In another embodiment, to increase the magnitude of the emitted light relative to the surroundings, the LED may emit light in non-visible wavelengths such as IR, NIR, or UV. In another example, the wavelength of light of the optical transmitter (216) is selected to maximize observability and signal to noise ratio in expected environmental conditions, such as dust, fog, snow and rain. Alternatively, the self-describing information can be distributed over different wavelengths of light, thus multiplying the data throughput by the number of wavelengths utilized. In another embodiment, the fiducial may include more than one LED, both to increase the data throughput and to provide additional information. In another embodiment, polarization of the emitted light is used to preclude multi-path (reflected) observations. In another embodiment, the LED beacon broadcasts information at a very narrow wavelength, while the receiving camera has a band-pass filter which limits the incoming spectrum to the wavelength of interest, and rejects light from other wavelengths. The robustness of the LED-based fiducial system to incorrect or incomplete signals, may also be increased by using signal processing techniques such as checksums or similar algorithms.

The LED fiducial is only one example of a light emitting fiducial. A variety of other light emitters may be used, including lasers, laser diodes, broad band light emitters, or modulation of existing emitters such as street lights, billboards, projectors, outdoor electronic displays, lighted signs, etc. In one example, a laser system situated in a key location projects self-describing fiducials onto facing buildings, using laser range finding information to estimate the position and position covariance of the fiducial, which information is embedded in the QR code for communication to navigating objects in the vicinity. In another example, large buildings form oversized fiducials by preferentially lighting or modulating light in rooms which are visible from the outside. In one embodiment, a triad of lasers at orthogonal angles to each other and of known different wavelengths, emanate from a single point and communicate self-describing fiducial information through modulation or similar means. This can allow the navigating object to directly measure the attitude of the navigating object in a single observation as well as the fiducial's position (the position of the origin, for use in a line-of-sight measurement). The frequency of the lasers may be selected so that the lasers are visible as they pass through the surrounding air. In another embodiment, an active, self-describing fiducial transmits additional information such as an indication that the navigating object is off a prescribed path, communicating motion correction commands much like a light bar on an aircraft carrier.

Figures 3A, 3B, 3C, 3D:
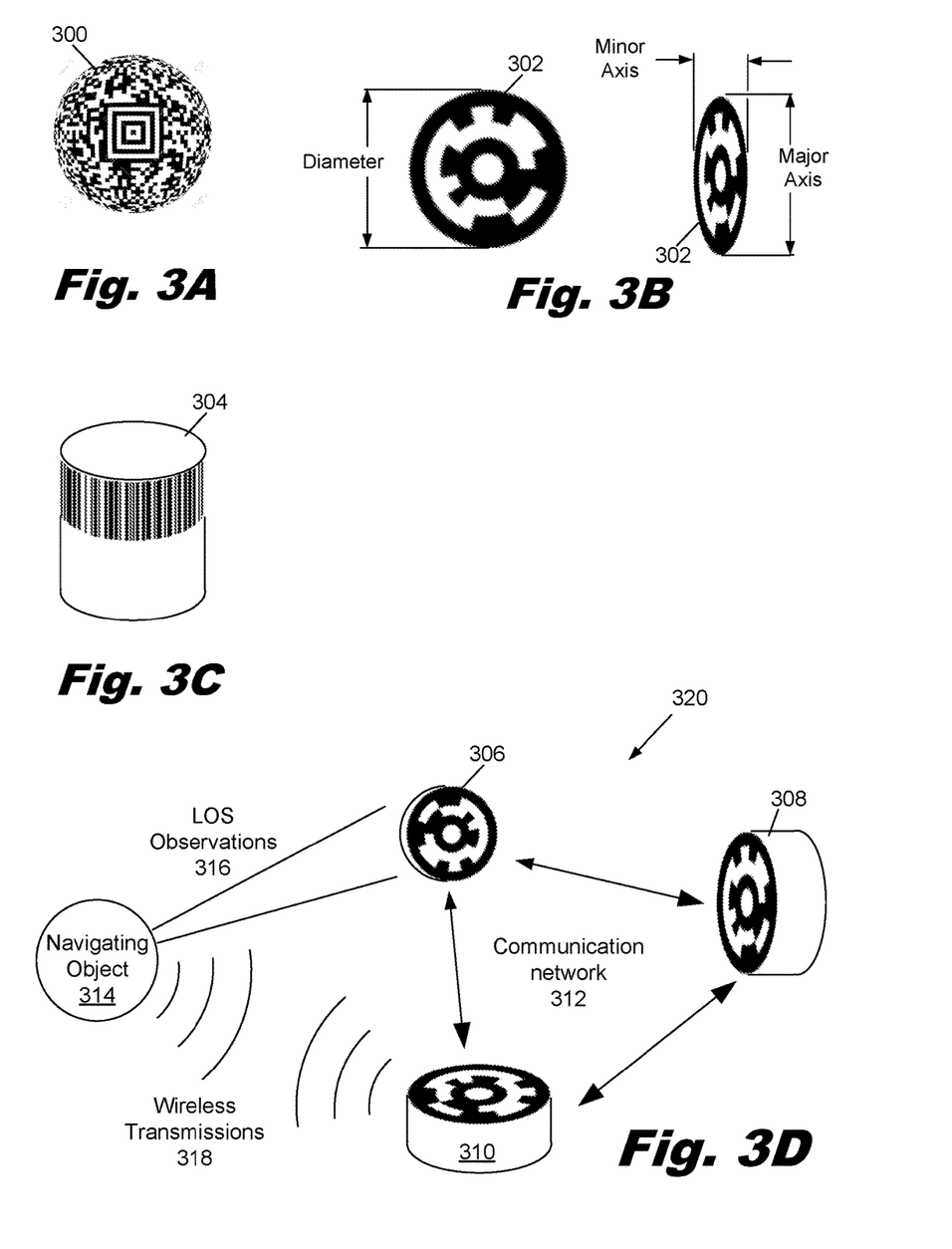
FIGS. 3A-3D show various self-describing fiducials and systems, according to embodiments of principles described herein.

FIGS. 3A-3D show a variety of different self-describing fiducials. FIG. 3A shows a globe (300) that has a barcode printed on it. In some example, the globe (300) fiducial may be internally illuminated for better contrast viewing of the bar code. In another example a glowing ball of known diameter with internal lighting or laser illumination forms a self-describing fiducial. In another embodiment, modulated sets of brake/tail/headlights on ground vehicles or navigation lights on air vehicles can form self-describing fiducials which enable vehicles to distribute navigation information and calculations, with baseline light emitter separation distance included as part of the communication packet with which observers can extract additional range and attitude information from an observation. Further, the concepts and principles described above may be combined or used with additional elements to achieve the desired navigation outcomes.

In some examples, the navigating drones may be able to make range observations based on the apparent size of the fiducial or the feature separation of elements of the fiducial. For example, the fiducial may have a known shape and/or size. As shown in FIG. 3B, a circular fiducial (302) may have a known diameter and when placed on a flat surface and when observed from a wide range of angles it appears as an oval with a major axis that corresponds to the diameter of the circle. Thus, the apparent size of the major axis of the oval allows for an estimate of the range from the fiducial to the drone to be made. The ratio of the major axis of the oval to the minor axis of the oval can provide an estimate of the angle of observation.

FIG. 3C shows a barcode (304) that is wrapped around a cylinder so that it can be observed from 360 degree angles. The data on the barcode (304) may be repeated so that the information can be retrieved from the barcode at any angle.

Other examples of fiducials that can allow for range or angle estimation may include QR codes with discernible features that have a predetermined size or spacing. In one embodiment, there may be multiple fiducials that have a known or estimated relationship to each other (a fiducial constellation or compound fiducial). A simple example of a constellation may be three points in a plane and one point out of the plane. This will create a coordinate system that provides at least a local location reference, and in many cases an attitude reference. For example, a first fiducial may be located on an upper corner of a rectangular building and additional fiducials located on one of the edges that join to form the corner. This and other compound fiducial configurations may provide a number of benefits such as the ability of the drone, after locating one of the fiducials in the constellation to predict where other fiducials in the constellation will be located. This allows the drone to window down its camera and/or limit its analysis of the camera data to specific locations. This may save computational time, conserve processing power for other tasks, and may reduce the energy required by the processor.

Additionally, if the spatial relationship between the fiducials is known with a high degree of certainty, a location estimate of one of the fiducials can be translated to other fiducials in the constellation. It may also reduce the amount of data used to describe or communicate the fiducial information. In one example, the location of the origin and attitude of the constellation can be transmitted as the complete description of the location of all of the fiducials in the constellation if the configuration of the constellation is known. Under ideal circumstances the location of each of the fiducials in the constellation would be known to a high level of accuracy and the relationship information between the fiducials in the constellation would be redundant. However, in real world conditions where the fiducials are placed in a GPS denied environment, the absolute location of the fiducials may be more difficult to obtain than the local relationships between the fiducials. Consequently, observation of the fiducial constellation can provide additional location information in some circumstances. For example, by knowing the relationship between the fiducials in the constellation, additional range and orientation information can be obtained from observations. In one example, the fiducials can be installed and then communicate between themselves, calculate a range between each other, and then initialize themselves into a local coordinate system. This process is one example of a self-initializing fiducial constellations. In some circumstances, this information may be sufficient for limited navigation of the drone or other navigating object because the drone may not need absolute positioning once it gets to a flight corridor. It can navigate along the flight corridor without absolute position if it knows its position and the position of the flight corridor relative to the local coordinate system created by the fiducial constellation.

FIG. 3D shows a constellation of self-describing fiducials (306, 308, 310). These fiducials can communicate between each other using a communication network (312). The fiducials may communicate any relevant information, include their absolute or relative positions, information relating to drones or other navigating objects, transit coordinates, etc. These fiducials may include any of the features or elements described above, separately or in combination. For example, they may include circular QR codes with known sizes to allow for range and angle approximations to be made by a navigating object (314). They may include encoded information in the QR code that communicates the location of the fiducial and/or an identity of the fiducial that allow for additional information to be accessed or retrieved. The fiducials may be back illuminated and/or may include modulating intensity or frequency of light to communicate information between other fiducials or to navigating objects. The fiducials may also include wireless communication (318) capabilities that allow for one-way or two-way communication with other fiducials, navigating objects or other elements. For example, a navigating object (314) may be able to determine approximate distance from an active fiducial (310) using a number of techniques, including time of flight of an RF transmission, power of a transmitted signal, or other techniques. This information can be combined with line of sight observations (316) to assist the navigating object.

Figure 4:
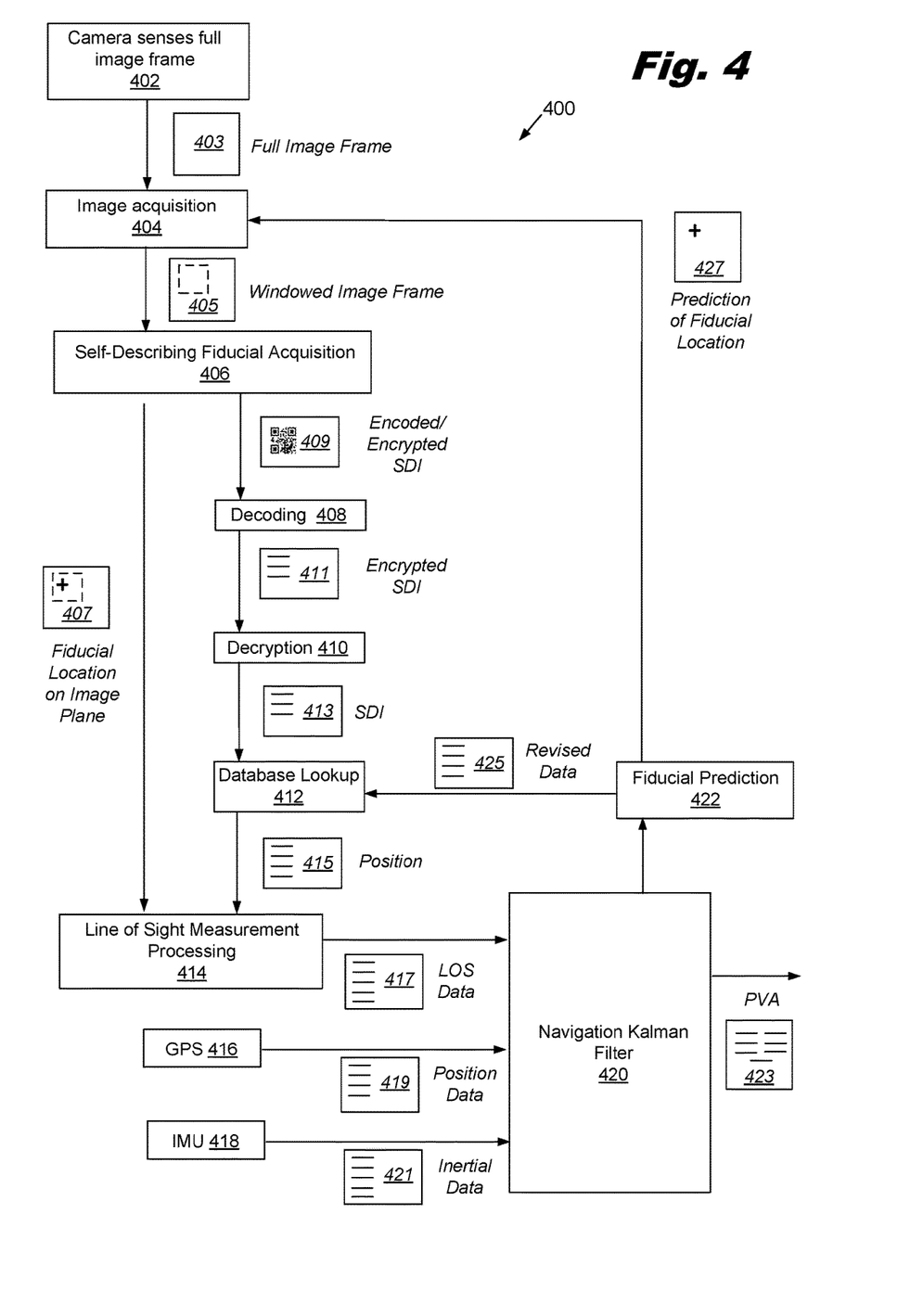
FIG. 4 is a flowchart of an illustrative method for robust and secure autonomous navigation utilizing self-describing fiducials, according to one embodiment of principles described herein.

FIG. 4 is a flowchart showing an illustrative example of a system and method (400) for a robust, secure autonomous navigation system utilizing self-describing fiducials. According to one illustrative embodiment the navigation system is initialized using IMU measurements from zero velocity conditions and GPS position measurements. While available, GPS position measurements are processed, resulting in PVA estimates and associated covariance estimates.

Prior or after entering a GPS-denied environment, the image (403) produced by the focal plane (step 402) is acquired (step 404) and scanned for a candidate barcode or other fiducials. This may include searching a windowed image frame (405). Once the barcode fiducial is acquired (step 406), the barcode pattern (409) is decoded to extract a dataset (step 408). The dataset may be an encrypted SDI (411) or may directly produce the desired information. The decryption (step 410) may be performed using an onboard key and to extract the self-describing information contained in the barcode fiducial. Additionally or alternatively the decryption or decoding process may access a database of information that is indexed according to the information communicated by the self-describing fiducials.

Once the self-describing information (413) is obtained, additional information can be obtained from a database lookup (step 412). The position and other information obtained (415) can then be used to predict the line-of-sight of the fiducial in the next image frame (step 422), given the current PVA estimates.

The position of the fiducial (415) and the fiducial location on the image plate (407) are used in a line of sight (LOS) measurement processing module (414) to calculate LOS data (417) as an input into the navigation Kalman filter (420). The LOS data (417), GPS data (419) from the GPS unit (416), if available; and inertial data (421) from the IMU (418) can be combined in the navigation Kalman filter to produce a PVA estimate (423) that allows the drone or other navigating object to understand its current position, velocity and attitude, thereby providing the information to navigate. Additionally, the Kalman filter may output a fiducial prediction (422) that predicts where the current fiducial is expected to be and/or where the next fiducial(s) are expected to be. If the transmitted or recorded location of the fiducial is uncertain or has an estimated error beyond a limit, revised data (425) produced from the fiducial prediction (422) may be incorporated into the database (412). This will improve the database information/lookup progressively as more observations of the fiducials are made. The fiducial prediction module (422) may also produce a prediction of the fiducial location (427) that can be used to acquire one or more self-describing fiducial by predicting a window within the image frame that the fiducial is expected to be in. Ideally this allows for faster processing of the image because only a portion of the image needs to be searched to locate the fiducial.

Additionally or alternatively, a grid system is utilized to minimize data throughput requirements, and to gradually transmit higher precision position information of the fiducial. In the grid system, a limited number of bytes are transmitted which specify the grid square that the vehicle is currently located in. Subsequent bytes specify the location of the vehicle inside the grid, with adjustable precision. Alternatively, data could be transmitted from most significant bit to least significant bit, such that the precision of the fiducial increases with the duration of lock-time on the fiducial.

In some examples, the measured line-of-sight of the barcode fiducial can be obtained directly from the digitized image. The difference between the predicted line-of-sight and the measured line-of-sight forms the residual. A nonzero residual is indicative of PVA estimation errors and is used inside the Kalman filter to provide first-order corrections to the PVA estimates. The current and possibly past PVA estimates provide a prediction of where in the current image the previously-acquired fiducial is likely to appear, which enables a search window of limited size and higher frame rate.

In addition to the embodiments described above, the principles described above may be implemented in a variety of ways. For example, the self-describing fiducials may serve as a complimentary navigation system, in combination with available GPS signals, and/or serve as a standalone navigation aiding system which could replace the information gained from GPS, or serve as an independent terrestrial alternative, providing increased robustness and an independent indication of GPS signal failure.

Additionally, the self-describing information may be decoded and decrypted to obtain ancillary information such as traffic volume levels, flight corridor heights and lateral location, speed restrictions, weather information, no fly zones, traffic patterns and pattern changes, an all-stop signal, etc. In another embodiment, the corrections produced by the Kalman filter provide corrections to the PVA estimates that are accurate to second-order, accounting for the nonlinearities present in line-of-sight observations. In another embodiment, alternative filtering techniques such as a least-squares filter, an unscented Kalman filter, an information Kalman filter, or particle filter are employed to provide corrections to the PVA estimates. In another embodiment, navigating objects maneuver such that PVA are optimally estimated given the spatial distribution of the self-describing fiducials in the vicinity. In another embodiment, a wearable self-describing fiducial is used for relative navigation of a drone which serves as a personal fan, light or observation post. In another embodiment, a wearable self-describing fiducial is used to enable people routing at large events, with overhead drone ushers shining color coded lights, forming person or group-specific paths on the ground which direct people to their entry points, exit points, restrooms or parking spots.

Figure 5:
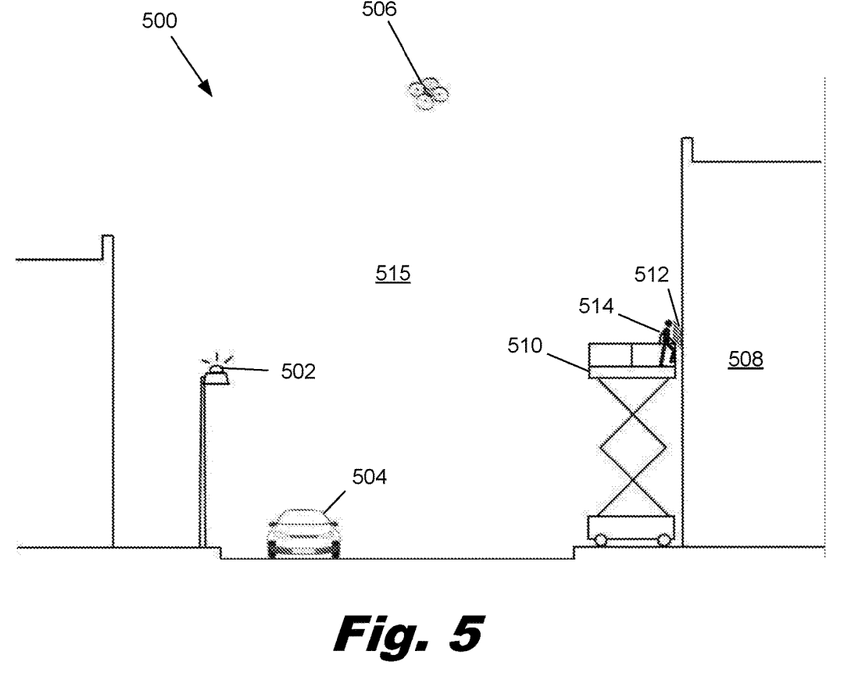
FIG. 5 is a diagram of an illustrative method for installing a self-describing fiducial for a robust and secure autonomous navigation system, according to one embodiment of principles described herein.

FIG. 5 shows one illustrative installation process of self-describing fiducials. In a representative embodiment (500), the fiducials (502, 512) can be installed in a variety of ways, including by a manned crew (514) on elevated structures (510) inside the urban canyon (515) where GPS signals are typically unreliable. Localization of the fiducials (502, 512) can be performed by long-term GPS observations, long enough to remove the effects of limited GPS satellite visibility, as well as ionospheric and tropospheric noise terms. In another embodiment, localization of the installed fiducials can be performed by an observer drone (506) above the urban canyon (515) with stable GPS signals. By observing the line-of-sight to the newly-installed fiducial (and previously-installed self-describing fiducials within the field of view) during translation of the observer drone(s) (504, 506), the location of the newly-installed fiducial (512) can be autonomously calculated using methods such as bundle adjustment or the coplanarity constraint equations. In addition, observing previously-installed self-describing fiducials (502) during the localization process of new fiducials (512) further improves localization accuracy. Additionally the amount of translation performed by the observer drone (506) can be more accurately measured using carrier phase GPS signal processing. In another embodiment, new self-describing fiducials can be installed by a drone that utilizes previously-installed and previously-localized self-describing fiducials for navigation and accurate guidance.

Additionally, the spatial distribution of the self-describing fiducials can be selected such that the navigating objects achieve a desired navigation accuracy with respect to one or more coordinate systems. Given a set of requirements for the navigation system (such as accuracy, navigating object velocity, number of self-describing fiducials visible at all points along a predetermined path to be traveled, system installation and operational costs, etc.), optimization algorithms such as Monte Carlo, gradient descent, linear programming, or convex optimization can be used to determine an optimal physical distribution of self-describing fiducials in the neighborhood of the path. If desired, the self-describing fiducials can also be placed with sufficient physical distribution (both horizontal and vertical) such that the position and attitude of the navigating object can be uniquely calculated from a single observation.

Additionally or alternatively, given a set of beacons physically distributed in the neighborhood of a flight corridor, optimization algorithms such as Monte Carlo, gradient descent, linear programming, or convex optimization can be used to determine a flight path that optimizes a set of requirements such as state observability, number of beacons instantaneously within the FOV, covariance of PVT estimates or IMU calibrations. Further, a drone or other navigating object may translate along a nominal path while simultaneously perturbing its attitude independent of the path to optimize navigation aiding from observations of the self-describing fiducials. In one example, drones that may need to re-calibrate sensor parameters in flight (including IMU scale factor, bias, misalignments, camera parameters such as distortion, focal length, magnetometer bias, etc.) can enter a navigation estimate maintenance corridor (either above, below or to the side of normal traffic corridors) where it has more freedom to perform optimal maneuvers for sensor parameter estimation, such as circles, figure eights, or Lissajou curves.

In one embodiment, the system of self-describing fiducials is made up of a fleet of drones or other mobile equipment. For example, along a specific route there may be 10 specialized drones that fly into strategic positions and broadcast their position using one or more self-describing fiducials. The specialized drones may initially fly at a relatively high altitude to fix their position using available GPS information and register the locations of visual landmarks below them. They can then descend into the urban canyon or GPS denied environment and supplement their IMU data with visual landmarks and any GPS information that may be available. In some embodiments, the drones that are descending into the GPS denied environment may use another portion of the drone fleet above them as fiducials to more accurately determine their position as they descend. Once the lower fiducial drones are in a desired location/distribution, they can secure themselves to surfaces and act as passive or active fiducials to the other drones or other navigating object traffic in the GPS denied area.

Additionally or alternatively, drones may place separate fiducials on surfaces in the GPS denied environment. For example, a drone may gather information about its location and place a printed sticker containing a self-describing fiducial at that location and then move on to a different location to place the next printed sticker. In other embodiments, the drone may apply a self-describing fiducial mark using other techniques such as inkjet printing, spray painting or laser etching. For example, the drone may include a reservoir of visible or IR ink and a method of dispensing the ink onto a surface that will support the self-describing fiducial. Other techniques may include laser etching surfaces so that the etched and unetched surfaces reflect light differently at a desired wavelength or range of wavelengths. In one example, the drone may simply carry self-describing fiducial modules that are attached to structures or the ground and transmit their location and/or other information. For example, the drone may have a number of self-describing fiducial darts or rounds that can be shot at buildings or structures. The darts/rounds may have an embedded LED that transmits information or communicate navigation information in some other way. The darts/rounds may partially penetrate or adhere to the structures.

In one embodiment, a drone may or may not have information that describes the location of a self-describing fiducial at the time the fiducial is placed or created. The fiducial may simply identify itself in a way that allows for the desired information to be referenced from a different source. For example, a relief operation may be undertaken in an urban environment where GPS signals are being disrupted by buildings and/or by active jamming equipment. A fleet of "marking" drones enters the area and makes self-describing fiducial markings on buildings without having precise information about the location of the fiducials. The information encoded/transmitted by the fiducials have labels/transmissions that at least identify the fiducial. A "best guess" of the fiducial position and position covariance can be made by the "marking" drone and entered into a matrix/database. As "mule" drones enter the area carrying the desired payloads, they optically identify the fiducials and look up the approximate location of the fiducials from the matrix/database. They use this location information to navigate and supplement their IMU sensors/calculations and any other guidance information that can be derived from GPS or visual data. However, the collective location/navigation information from the set of navigating drones is also used to fine tune the matrix/database of fiducial information. Thus, the matrix/database of fiducial locations may initially be relatively coarse, but becomes more refined over time as more drones contribute navigation information or other sources of location information are obtained. In one example, drones that enter the GPS denied environment may navigate through the area as best they can using SLAM along with whatever fiducial information and sensor synthesis is available. They go into the area with a high accuracy/precision navigation information and can transfer this information to the matrix for the fiducials that they first encounter. They may lose accuracy as they progress into the GPS denied environment and then recover accuracy as they exit the area or cross an already refined set of fiducials. As they discover the errors in their navigation data upon exiting the GPS denied environment, their observations of fiducials before they exited the GPS denied environment can be improved and propagated into the fiducial matrix/database. Thus, the accuracy of the matrix/database improves over time because of the accumulated observations.

Figure 6A:
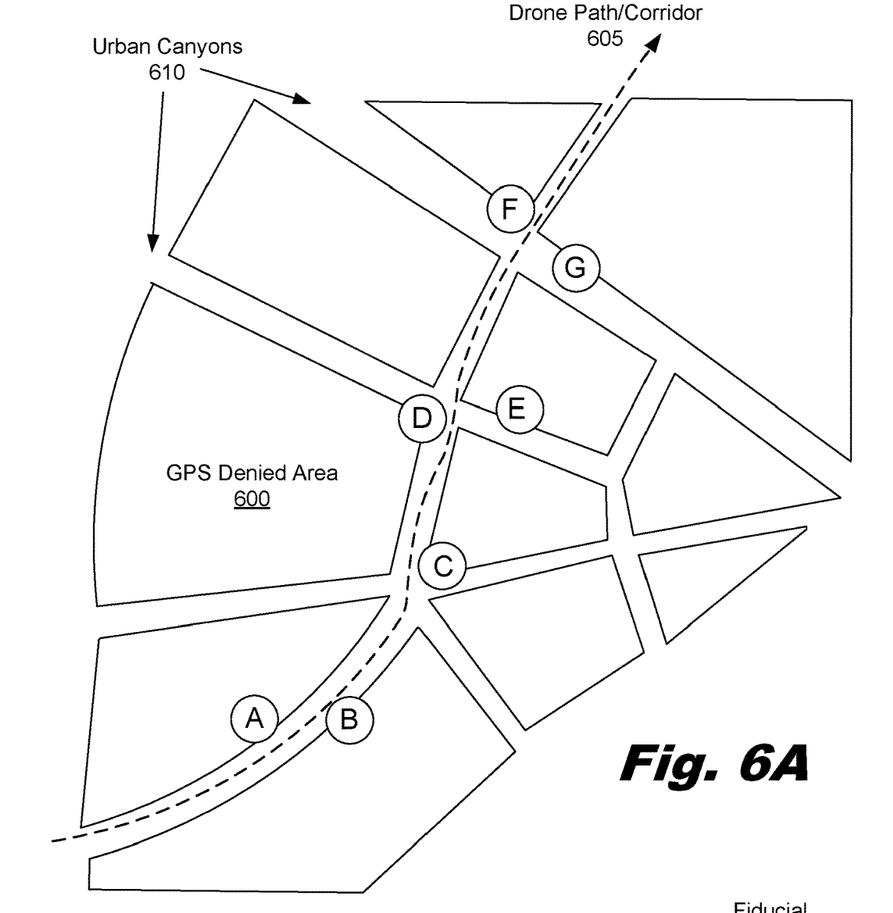
FIGS. 6A-6B describe illustrative systems and methods for deploying and using self-describing fiducials in a GPS denied area, according to one embodiment of principles described herein.

FIGS. 6A and 6B illustrate one example of the above principles. FIG. 6A shows a plan view of a GPS denied area (600). The GPS denied area (600) may be actively denied by jammers/spoofers and/or may include urban canyons (610). The "marking" drone may place/identify the first several fiducial marks (A, B, C) with an accuracy of centimeters but as it proceeds deeper into the GPS denied environment the covariance of the fiducial locations (D, E, F, G) may increase to meters or even tens of meters. The fiducials mark a drone path or corridor (605). The fiducials, once placed and associated with location information, may be used by a wide range of navigating objects, including ground based drones, air based drones, missiles, ground troops, first responders or other navigating objects.

In this example the first "mule" drone that is delivering humanitarian supplies can progress with confidence through the first fiducials (A, B, C) and then rely primarily on its IMU data as it continues deeper into the GPS denied area. Its observations of the next several fiducials (D, E) may be fairly accurate and are propagated to the matrix/database. However, the "mule" drone may make less accurate observations of fiducials F and G. But as it exits the GPS denied environment close to F and G, the accuracy with which it knows its position increases dramatically. This information is propagated backward in time to increase the accuracy of the last several fiducial observations (F, G). Consequently, as additional drones pass through the area, each can progress with more confidence in the area marked by fiducials (A, B, C, D, E, F, G) and contribute more accurate information to the matrix/database from their own observations.

The example given above is only illustrative. A variety of variations, combinations, and extensions of the principles described could be used. For example, drones could be specialized to improve the distribution of fiducials and rapidly increase the location accuracy of the fiducial matrix. "Marker" drones may be adept at visually identifying desirable locations for fiducials and accurately placing the fiducials on the surfaces. Self-describing fiducials may be placed near high contrast, pre-existing landmarks, creating an optimized coarse-fine fiducial matrix. A "surveyor" drone with superior navigation/communication equipment may follow the "marker" drone(s) and refine the location estimates in the fiducial matrix. The "mule" drones may simply use the fiducials or may contribute location observations to the matrix/database.

In other embodiments, a single drone may perform all tasks. For example, a drone may have a marker payload and enter the GPS denied environment, place its markers, transmit (if possible) or store the best known location of the self-describing fiducials and select an exit from the area that increases its chances of obtaining relevant navigation information to add to the fiducial matrix/database. It then obtains another marker load and reenters the area to improve the location information for the previously placed fiducials and to place/locate additional fiducials. It may take a different route within and enter/exit the area from different locations to optimize the navigation information. The drone may then have access to enough self-describing fiducials to navigate with a payload to a specified location with a required accuracy.

Figure 6B:
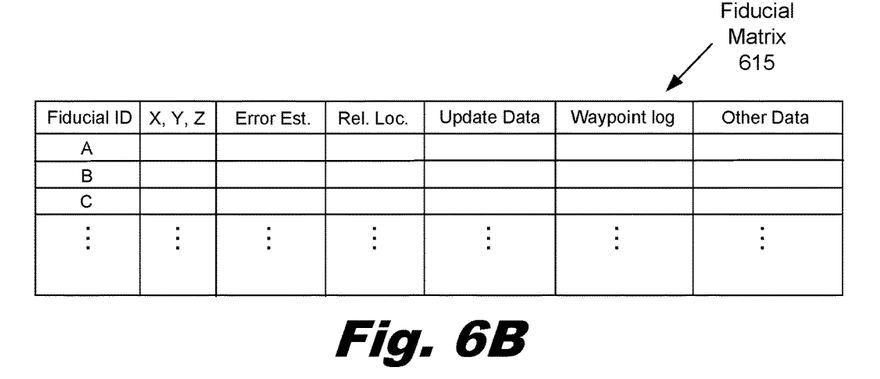

Additionally or alternatively, multiple "marker" drones may enter the GPS environment from different directions/routes and place self-describing fiducials as they go, then cross paths or exit along entry paths of other marker drones. This will allow the exiting drones to make observations of fiducials placed by other drones and allow for more precise navigation during the exit. The observations of all the drones are combined (in some examples in real time) to create a more accurate self-describing fiducial matrix/database. FIG. 6B shows one example of a self-describing fiducial matrix (615). This matrix may include a variety of information, including a fiducial identifier (Fiducial ID), location information of the fiducial (X, Y, Z), an error estimate of the location (Error Est.), a relative location (Rel. Loc.) of other fiducials or landmarks, updated information (Update Data) that records data that was added/improved in the matrix, a waypoint log (Waypoint Log) that records which navigating objects have encountered the fiducial, and other data (Other Data). This other data may be any data that has been described herein or other data that could be useful to the navigating objects or self-describing fiducial system.

As described above, a self-describing fiducial navigation system may be a low-cost, resilient backup navigation system for GPS denied situations such as tunnels, urban canyons, extreme weather events, GPS/GLONASS/GALILEO satellite dropouts or destruction during wartime. In one example, a drone could serve as a self-describing fiducial in an emergency (modulating one or more LEDs of its own). This capability is synergistic with a quick response, for example to an accident on a busy roadway, since the drone would get to the scene of the accident before a patrol car could, and would assess the situation, determine medical personnel needs, broadcast the precise location of the accident, and re-route traffic around the accident site. In another embodiment, QR codes or other self-describing fiducials could be placed on mile markers and other plentiful signage "real estate" along roadways. In some instances, a pre-existing sign could be used as a self-describing fiducial. For example, mile markers could be optically read by a navigating object and associated with their location in a database. Additionally, electronic signs that incorporate light banks or lighted TV boards could be used as updateable fiducials. In some examples, the electronic signs could be used as compound fiducials by illuminating only a portion of the sign. For example, corners of a large electronic sign could be modulated to form a large 2D self-describing fiducial. In some instances the 2D self-describing fiducial may broadcast its baseline distance to allow for range and attitude estimates to be made. As discussed above, the sign fiducials may broadcast other information such as weather and wind information or the location of a recharging station or drop-off point.

The modulation of light (i.e. changing the intensity of the light) has been discussed as one way for a self-describing fiducial to transmit information. However, there are a number of different parameters in addition to the intensity of the light that could be modulated. For example, the frequency or phase of light or other property could be modulated. One example may be a self-describing fiducial that broadcasts radio frequency signals that are monitored by a drone. The drone could use the doppler effect to obtain a range rate (RF) measurement, or time of flight from radar to obtain a range measurement. In another example, the navigating object emits a wavelength of electromagnetic radiation, such as light in a flash lidar system, and self-describing fiducials with phosphorescents respond with a known signature, much like echolocation for bats, but with purpose-built self-describing fiducials. In another embodiment, a holographic projector is used to project three dimensional self-describing fiducials. In this case, the viewing angle determines what is seen, providing additional navigation information. A related embodiment may include self-describing fiducials formed from active or reflective bokodes, which can be less intrusive than QR codes. Other sources of information can also be used to improve the accuracy of the fiducial matrix, including laser range finding to measure distances to/between fiducials, optical matching to photo reconnaissance images or data, manual observations by support personnel, sonar or radar observations, or other sources.

Thus, a self-describing fiducial may include a communication element that optically communicates navigation-aiding information. This communication element may include any of a number of elements, including those described above, such as a barcode (e.g. 304, FIG. 3C), a QR code (e.g. 118, FIG. 1; 210, FIG. 2A, 302, FIG. 3B), a 3D QR code (300, FIG. 3A) a light emitting source (e.g. 216, FIG. 2B, 106, FIG. 1), an illuminated sign or billboard (e.g. 142, FIG. 1). In some instances the communication element may include a dynamic barcode communicating time varying data. For example, the dynamic bar code may be on a navigating vehicle that updates its location or may be on a sign that transmits weather information or control signals to the navigating objects. The communication element may include a three dimensional barcode visible through a 360 degree angle, such as those shown in FIG. 3A and FIG. 3C for example. The communication element may include a light emitting source (e.g. 216, FIG. 2B; 116, 142, FIG. 1) that communicates the navigation-aiding information optically by modulation of the light intensity, frequency, wavelength, polarization or other parameter. In some examples the light may be nonvisible, such as infrared or ultraviolet light. Polarizing the light emitted by the source can have a number of advantages, including providing information about orientation/attitude and elimination of reflected light sources (reflections alter the polarization). For example, the light source could emit two different wavelengths of light, one wavelength polarized horizontally and the other wavelength polarized vertically. If the comparative amplitude of the two different polarizations changes or additional polarizations are present, it can be determined that the received light has been reflected and does not come directly from the light source. This and other polarization techniques can be used to mitigate the effect of reflections on the self-describing fiducials.

The navigation-aiding information may include the position of the self-describing fiducial with respect to one or more coordinate systems. For example, these coordinate systems may include a localized coordinate system created by a constellation of self-describing fiducials, other earth centered coordinate systems, or a celestial coordinate system. The communication element communicates the navigation-aiding information to one or more navigating objects in the vicinity of the self-describing fiducial. The navigating objects may be people, ground vehicles, flying vehicles, etc. The navigation aiding information may also include covariance information associated with the position of the self-describing fiducial. This provides information about the accuracy/precision of the location information. In some embodiments, the self-describing fiducials may remain in a standby state waiting for a navigating object to request information. For example, the navigating object may send out an electromagnetic or optical signal that triggers the self-describing fiducial to begin transmitting its location. The triggering signal may or may not be encoded. The communication element may also communicate navigation aiding information that includes one or more of: traffic volume levels, flight corridor heights, lateral location, speed restrictions, weather information, no fly zones, traffic patterns, or an all-stop signal. The communication element may not directly communicate the location of the fiducial. For example, the communication element may optically transmits a pointer to a matrix (615) stored in the navigating device and/or elsewhere. The matrix includes location information for the self-describing fiducial. This can be beneficial for a number of reasons, including maintaining security, for simplicity, and so that information can be more readily updated. For example, a slave version of the matrix may be stored on the navigating device. The slave version may be updated from a master version located in a different location. The slave version may also communicate updates to the master version for the local area in which the navigating object traversed.

Thus, a system of self-describing fiducials (320, FIG. 3D) may include a plurality of self-describing fiducials (306, 308, 310; FIG. 3D), each self-describing fiducial optically communicating its location and position covariance information related to its location. The navigating object (314, FIG. 3D) may have a clear line of sight to a portion of the self-describing fiducials, wherein the self-describing fiducials are physically distributed such that the navigating object uniquely calculates its position from a single observation. In some embodiments, the plurality of self-describing fiducials self-initialize by estimating at least one of: relative position to other surrounding self-describing fiducials and a location of the self-describing fiducial with respect to at least one coordinate system.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A self-describing fiducial comprising:
a communication element that is configured to optically communicate navigation state estimation aiding information to one or more navigating objects in the vicinity of the self-describing fiducial for state estimation;
wherein the navigation-aiding information comprises a geographic position of the self-describing fiducial with respect to one or more coordinate systems.

2. The self-describing fiducial of claim 1, wherein the communication element comprises a barcode.

3. The self-describing fiducial of claim 1, wherein the communication element comprises a dynamic barcode communicating time varying data.

4. The self-describing fiducial of claim 1, wherein the communication element comprises a barcode visible through a 360 degree angle.

5. The self-describing fiducial of claim 1, wherein the communication element comprises a light emitting source and wherein the navigation-aiding information is optically communicated by modulation of the light emitted by the light emitting source.

6. The self-describing fiducial of claim 5, wherein light from the light emitting source comprises at least one of: nonvisible light and polarized light.

7. The self-describing fiducial of claim 1, wherein the navigation aiding information comprises covariance information associated with the position of the self-describing fiducial.

8. The self-describing fiducial of claim 1, wherein the self-describing fiducial comprises:
a power source; and
an encoder;
wherein the communication element comprises an optical transmitter, wherein the power source provides power to the encoder, and the encoder encodes a location of the self-describing fiducial to produce an encoded location and the optical transmitter optically broadcasts the encoded location.

9. The self-describing fiducial of claim 1, wherein the communication element further communicates navigation aiding information comprising at least one of: traffic volume levels, flight corridor heights, lateral location, speed restrictions, weather information, no fly zones, traffic patterns, or an all-stop signal.

10. The self-describing fiducial of claim 1, wherein the self-describing fiducial is on a navigating object and wherein the self-describing fiducial transmits navigation parameters of the navigating object.

11. The self-describing fiducial of claim 1, wherein the power source comprises a solar panel and the communication element comprises at least one light emitting diode.

12. The self-describing fiducial of claim 1, wherein the communication element optically transmits a pointer to a matrix stored in the navigating device, the matrix comprising location information for the self-describing fiducial.

13. The self-describing fiducial of claim 1, wherein the matrix stored on the navigating device is updated to improve accuracy of the location information.

14. A system of self-describing fiducials comprising a plurality of self-describing fiducials, each self-describing fiducial optically communicating its location and position covariance information related to its location.

15. The system of claim 14, further comprising a navigating object having a clear line of sight to a portion of the self-describing fiducials, wherein the self-describing fiducials are physically distributed such that the navigating object uniquely calculates its position from a single observation.

16. The system of claim 14, wherein the plurality of self-describing fiducials self-initialize by estimating at least one of: relative position to other surrounding self-describing fiducials and a location of the self-describing fiducial with respect to at least one coordinate system.

17. A method for navigating comprising:
taking an image with a camera mounted on a navigating object;
identifying a self-describing fiducial within the image;
acquiring an optically communicated geographic position of the self-describing fiducial; and
processing the optically communicated location to estimate at least one navigational state of the navigating object.

18. The method of claim 17, wherein acquiring an optically communicated location of the self-describing fiducial comprises analyzing an image of the self-describing fiducial, wherein the self-describing fiducial comprises a barcode.

19. The method of claim 17, further comprising calculating an angle of the self-describing fiducial by calculating a location of an image of the self-describing fiducial on a focal plane of the camera.

20. The method of claim 17, wherein processing the optically communicated location comprises inputting the optically communicated location into a navigation filter.

* * * * *